(12) United States Patent
King et al.

(10) Patent No.: US 9,548,052 B2
(45) Date of Patent: Jan. 17, 2017

(54) EBOOK INTERACTION USING SPEECH RECOGNITION

(71) Applicant: Google Inc., Mountain View, CA (US)

(72) Inventors: Virgil Scott King, Arlington, MA (US); Julian Paul Grady, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 130 days.

(21) Appl. No.: 14/108,764

(22) Filed: Dec. 17, 2013

(65) Prior Publication Data

US 2015/0170648 A1 Jun. 18, 2015

(51) Int. Cl.
*G10L 15/22* (2006.01)
*G06F 3/0483* (2013.01)
*G06F 3/16* (2006.01)
*G06F 17/21* (2006.01)
*G06F 3/0485* (2013.01)
*G06F 3/0484* (2013.01)
*G06F 15/02* (2006.01)

(52) U.S. Cl.
CPC ............. *G10L 15/22* (2013.01); *G06F 3/0483* (2013.01); *G06F 3/0485* (2013.01); *G06F 3/04842* (2013.01); *G06F 3/167* (2013.01); *G06F 15/0291* (2013.01); *G06F 17/21* (2013.01); *G09G 2380/14* (2013.01); *G10L 2015/223* (2013.01)

(58) Field of Classification Search
CPC ................................. G10L 15/02; G09B 19/04
USPC ....................................................... 704/235
See application file for complete search history.

(56) References Cited

U.S. PATENT DOCUMENTS

| 7,206,389 | B1* | 4/2007 | Dumoulin | G10L 15/1822 379/218.01 |
|---|---|---|---|---|
| 2003/0003428 | A1* | 1/2003 | Dalstrom | G09B 17/04 434/178 |
| 2008/0140401 | A1* | 6/2008 | Abrash | G09B 19/06 704/251 |
| 2008/0140411 | A1* | 6/2008 | Millman | G09B 5/062 704/270 |
| 2008/0256040 | A1* | 10/2008 | Sundaresan | G06Q 30/02 |
| 2011/0044438 | A1* | 2/2011 | Wang | H04W 4/206 379/93.02 |
| 2011/0288861 | A1 | 11/2011 | Kurzweil et al. | |

(Continued)

OTHER PUBLICATIONS

"Get Browsealoud," 2 Pages, [online] [Retrieved on Aug. 20, 2014] Retrieved from the internet <URL:http://www.browsealoud.com/au/support/getbrowsealoud/>.

(Continued)

*Primary Examiner* — Shreyans Patel
(74) *Attorney, Agent, or Firm* — Fenwick & West LLP

(57) ABSTRACT

A user device receives audio data of a user reading aloud a displayed portion of an ebook, and converts a portion of the audio data to spoken-text data. The user device determines one or more similarity scores based on a comparison between the spoken-text data and text data associated with the displayed portion of the ebook, and ranks the one or more similarity scores to determine a reading location in the text data that corresponds to the spoken-text data. The user device determines a pronunciation score using the spoken-text data and pronunciation data associated with the text data at the reading location. The user device performs an action based in part on the reading location and the pronunciation score.

14 Claims, 6 Drawing Sheets

(56) References Cited

U.S. PATENT DOCUMENTS

2012/0102401 A1* 4/2012 Ijas .................... G06F 3/04842
715/702

OTHER PUBLICATIONS

K-NFB Reading Technology, Inc. "Blio on the App Store on iTunes," Aug. 12, 2014, 2 Pages, [online] [Retrieved on Aug. 20, 2014] Retrieved from the internet <URL:https://itunes.apple.com/us/app/blio/id409370678?mt=8>.
Webpage for Read2Go, 2 Pages, [online] [Retrieved on Aug. 20, 2014] Retrieved from the internet <URL:http://read2go.org/>.

* cited by examiner

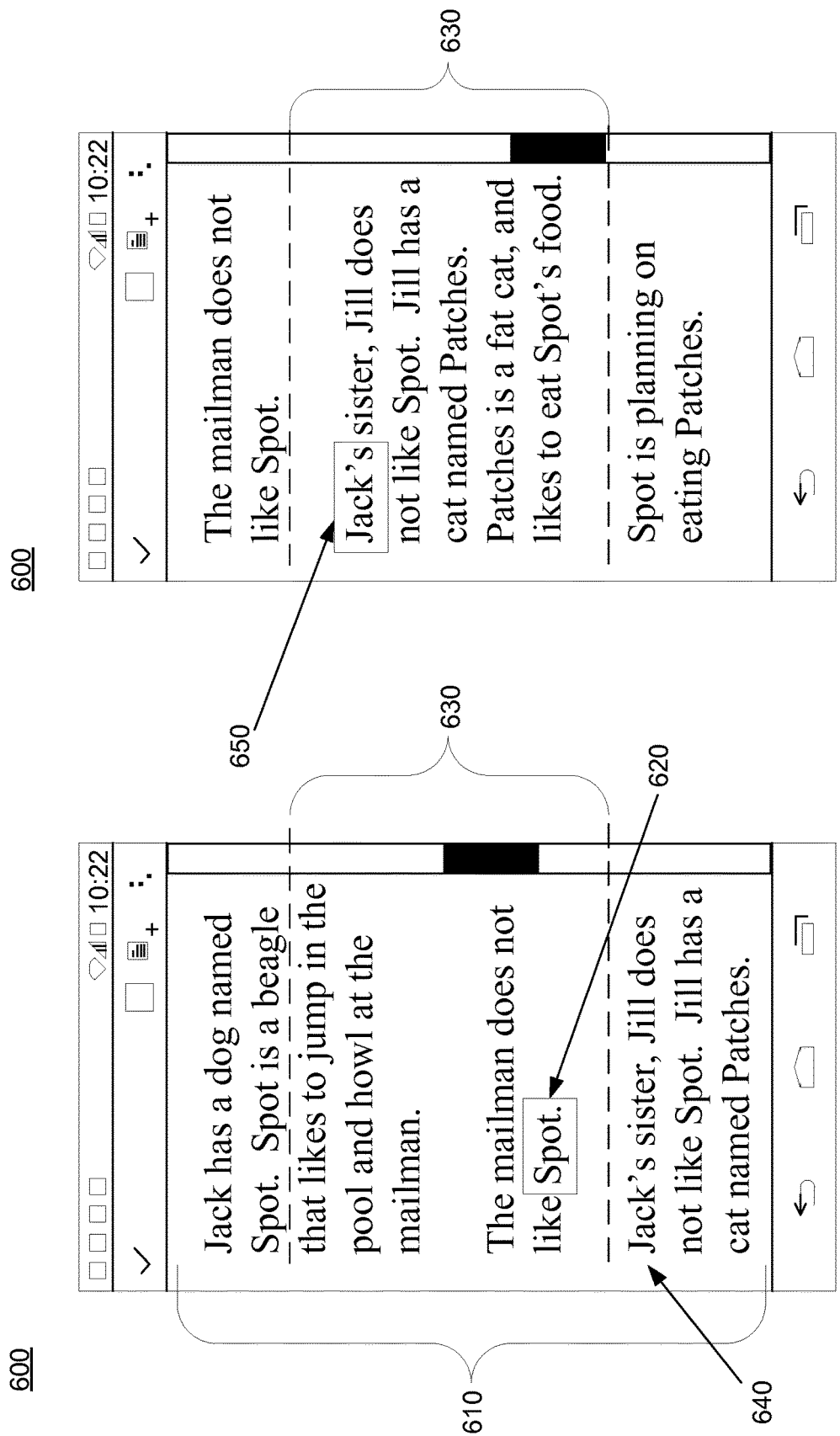

EBOOK INTERACTION USING SPEECH RECOGNITION

BACKGROUND

Field of Disclosure

This disclosure relates to the field of text processing generally, and specifically to interacting with ebooks using speech recognition.

Description of the Related Art

Many users utilize their digital devices to read material such as novels, news articles, short stories, etc., in an effort to learn how to read or teach others how to read. For example, when teaching a child to read by reading a book aloud, the child may have difficulty associating spoken words with written words. One method people use is to point to each word as it's read aloud. However, such a method generally obscures part of the page. Other methods may employ e-readers and/or tablet computers that read ebooks (i.e., are books in a digital format) to the child using a text-to-speech (TTS) capability that allows the device to speak text using a synthesized voice. However, these devices are somewhat impersonal, especially when compared to two people reading text aloud together (e.g., a parent teaching a child how to properly pronounce a word).

Moreover, in some cases people with disabilities are not able to utilize digital devices to read ebooks because they are not able to interface effectively with the digital devices. For example, some disabled people are physically unable to turn pages of an ebook on digital devices via traditional methods (e.g., finger swipe, selecting a button, etc.).

SUMMARY

The above and other needs are met by a computer-implemented method, a non-transitory computer-readable storage medium storing executable code, and a system for interacting with an ebook using speech recognition.

One embodiment of the computer-implemented method for interacting with an ebook using speech recognition, comprises receiving audio data of a user reading aloud a displayed portion of an ebook, and a portion of the audio data is converted to spoken-text data. One or more similarity scores are determined based on a comparison between the spoken-text data and text data associated with the displayed portion of the ebook. The one or more similarity scores are ranked to determine a reading location in the text data that corresponds to the spoken-text data. A pronunciation score is determined using the spoken-text data and pronunciation data associated with the text data at the reading location. An action is performed based in part on the reading location and the pronunciation score.

One embodiment of a non-transitory computer-readable storage medium storing executable computer program instructions for interacting with an ebook using speech recognition, comprises receiving audio data of a user reading aloud a displayed portion of an ebook, and a portion of the audio data is converted to spoken-text data. One or more similarity scores are determined based on a comparison between the spoken-text data and text data associated with the displayed portion of the ebook. The one or more similarity scores are ranked to determine a reading location in the text data that corresponds to the spoken-text data. A pronunciation score is determined using the spoken-text data and pronunciation data associated with the text data at the reading location. An action is performed based in part on the reading location and the pronunciation score.

One embodiment of a system for interacting with an ebook using speech recognition, comprises a processor configured to execute modules, and a memory storing the modules. The modules include a speech-to-text module configured to receive audio data of a user reading aloud a displayed portion of an ebook, and convert a portion of the audio data to spoken-text data. The modules also include a correlation module configured to determine one or more similarity scores based on a comparison between the spoken-text data and text data associated with the displayed portion of the ebook. The modules also include a ranking module configured to rank the one or more similarity scores to determine a reading location in the text data that corresponds to the spoken-text data. The modules also include a quality module configured to determine a pronunciation score using the spoken-text data and pronunciation data associated with the text data at the reading location; and an action module configured to perform an action based in part on the reading location and the pronunciation score.

BRIEF DESCRIPTION OF DRAWINGS

FIG. 6A illustrates an example of a user interface displayed by a user device showing a reading location at the end of a reading region according to an embodiment.

FIG. 6B illustrates the user interface of FIG. 6A showing scrolled text data such the reading location is at the beginning of the reading region according to an embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
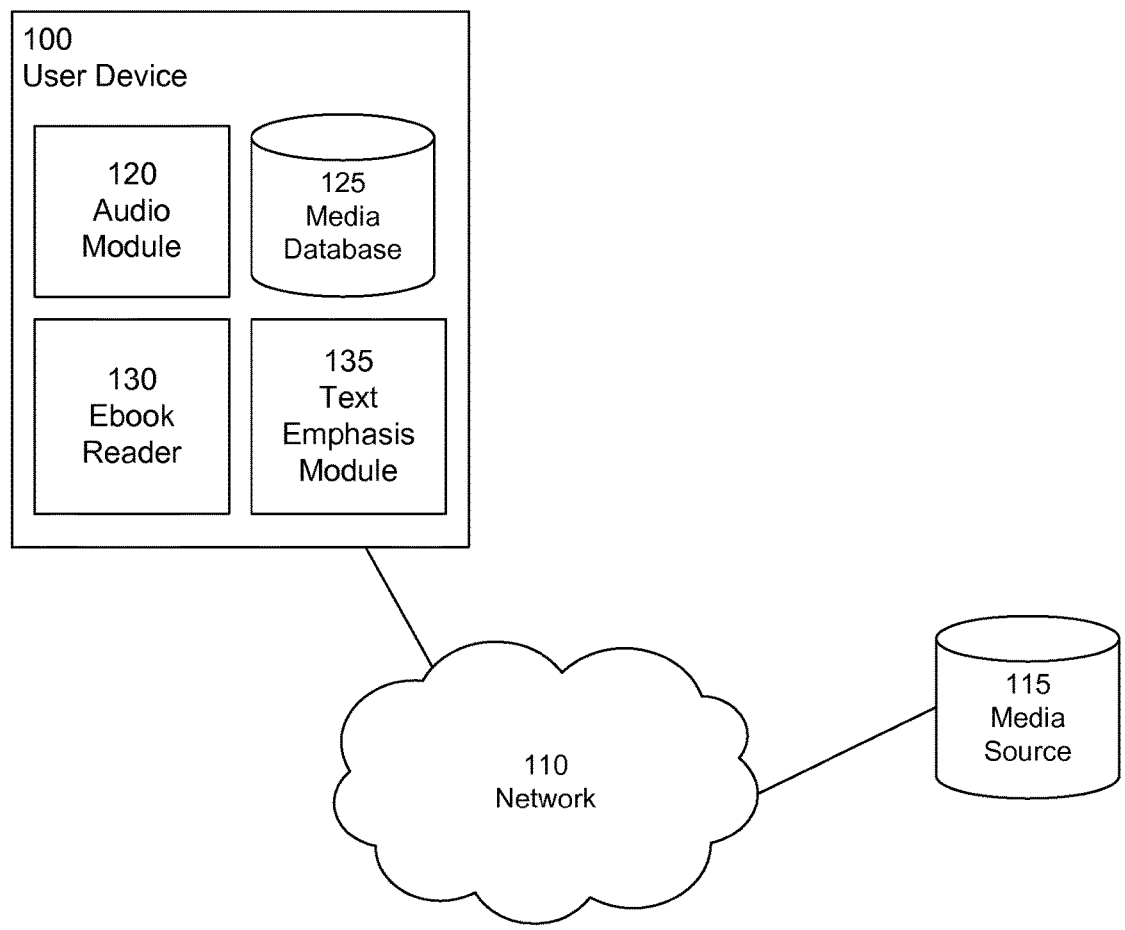
FIG. 1 is a high-level block diagram illustrating an embodiment of an environment for interacting with an ebook using speech recognition.

FIG. 1 is a high-level block diagram illustrating an embodiment of an environment for interacting with an ebook using speech recognition. The environment includes a user device 100 connected by a network 110 to a media source 115. Here only one user device 100 and media source 115 are illustrated but there may be multiple instances of each of these entities. For example, there may be thousands or millions of user devices 100 in communication with multiple media sources 115.

The network 110 provides a communication infrastructure between the user devices 100 and the media sources 115. The network 110 is typically the Internet, but may be any network, including but not limited to a Local Area Network (LAN), a Metropolitan Area Network (MAN), a Wide Area Network (WAN), a mobile wired or wireless network, a private network, or a virtual private network.

The user devices 100 are computing devices that execute computer program modules—e.g., a web browser or other client application—which allow a user to view ebooks and consume other media. A user device 100 might be, for example, a personal computer, a tablet computer, a smart phone, a laptop computer, GOOGLE GLASS®, a dedicated e-reader, or other type of network-capable device such as a networked television or set-top box.

The media source 115 is an archive that stores ebook data. Ebook data includes, for example, text data of the ebooks, pronunciation data for text contents of the ebooks, or some combination thereof. Text data is the textual content of an ebook (i.e., words, numbers, etc.). Pronunciation data is data that describes one or more correct pronunciations for an association word and/or phrase. In some embodiments, pronunciation data includes associated phonemes. A phoneme is the smallest element of a language—a representation of the sounds we make and put together to form meaningful expressions. Additionally, in some embodiments, pronunciation data includes a capability to be played for the user, such that the user may hear one or more correct pronunciations for a word. The media source 115 is an archive such as an ebook retailer or a library.

A user device 100 comprises an audio module 120, a media database 125, an ebook reader 130, and a text emphasis module 135 in one embodiment. In one embodiment these entities are software application modules executing on the user device 100. For example, the modules 120, 125, 130, 135 may be integrated into a smart phone application executing on a smart phone.

The audio module 120 receives audio data of a user reading a displayed portion of an ebook. Audio data is a real time data stream of a user's voice as he or she read a displayed portion of an ebook. The audio module 120 receives the audio data via, for example, a microphone coupled to the user device 100. The audio module 120 is configured to pass the received audio data to the text-emphasis module 135.

Additionally, in some embodiments, the audio module 120 may read aloud text (e.g., a word or phrase on a displayed portion of an ebook) to a user of the client device 100. The audio module 120 may utilize, for example, a speaker coupled to the user device 100, to read text to the user.

The media database 125 stores ebooks and information relating to the ebooks. Information relating to ebooks includes, for example, text data, pronunciation data, metadata associated with the ebook, or some combination thereof. The metadata describes different aspects of the media item. The metadata may comprise, for example, author, date of publishing, reviews, genre information, publisher, ratings, a media item identifier etc.

The ebook reader 130 enables a user operating the user device 100 to request a portion of an ebook (which could be the entire ebook) from the media database 125 and/or the media source 115. The ebook reader 130 enables the user operating the user device 100 to view the requested portion of the ebook once the ebook data has been downloaded. For example, the user operating the user device 100 may select an ebook to read from a list of ebook choices displayed via the ebook reader 130, and the ebook reader 130 then sends a request for the selected ebook to the media source 115. The ebook request includes an ebook identifier that identifies the ebook. The ebook identifier may comprise, for example, information that identifies a book such as a title, author, publishing date, International Standard Book Number (ISBN), or another identifier known to the media source 115. In another embodiment the ebook identifier is a hash that is computed from the data associated with the ebook, and which uniquely identifies the ebook. The hash may be computed by the ebook reader 130 from the ebook or, the media source 115, or other sources of ebooks. The ebook request may also be used to request a pronunciation data that is associated with an ebook. The ebook reader 106 may download the requested ebook (or portions thereof) over the network 110 from the media source 115, or some other source of ebooks.

The ebook reader 130 is configured to display ebook data to a user operating the user device 100, enabling the user to read the ebook data. The ebook reader 130 is able to display emphasized portions of text data (i.e., words or groups of words). An emphasized word is changed to distinguish it from other non-emphasized text in the ebook. For example, an emphasized word may be highlighted, bolded, italicized, underlined, in a different font from the non-emphasized words, in a different typeface from the non-emphasized words, in a different font color from the non-emphasized words, or some combination thereof.

The text emphasis module 135 is configured to convert a portion of the audio data to spoken-text data. Spoken-text data is text that corresponds to the words spoken in the converted portion of the audio data. Additionally, in some embodiments, the text emphasis module 135 is configured to perform voice recognition on one or more of the voices in the audio data, and filter one or more user's voices from the spoken-text data.

The text emphasis module 135 emphasizes text at a user's current reading location. To this end, the text emphasis module 135 determines a user's reading location using the spoken-text data. The text emphasis module 135 is configured to score the text data based on a comparison spoken-text data and text data associated with a displayed portion of the ebook. The text emphasis module 135 is configured to rank the text data, and the user's reading location corresponds to the text data with the highest score. In some embodiments, as discussed below in conjunction with FIG. 3, the text emphasis module 135 is configured to weight the scores using additional factors (e.g., last word emphasized).

The text emphasis module 135 scores the user's pronunciation of the text data user using the spoken-text data and pronunciation data associated with the text data at the reading location. The text emphasis module 135 then performs one or more actions based in part on the reading location and the pronunciation score. For example, the text emphasis module may emphasize a word when it is pronounced correctly by a user.

The text emphasis module 135 facilitates the user client 100 as a teaching tool for both children and adults. For example, in teaching a child to read a spoken word may be automatically emphasized—thus helping teach the child to associate the spoken word with its associated text. Moreover, the reader is able to dynamically vary their reading pace in response to the child's mastery of different words (e.g., can stop to answer questions). Additionally, the text emphasis module 135 may also assist adults learning a foreign language and/or a child learning to read. For example, the text emphasis module 135 may emphasize words in a manner that indicates how well the words were pronounced, and in some embodiments, may provide pronunciation tips that help the reader learn correct pronunciation.

Additionally, in some embodiments, the text emphasis module 135 may automatically scroll the displayed text or turn the page of the ebook based on the user's reading location. Thus, allowing users who are physically unable to turn pages in an ebook using traditional means (e.g., selecting a button, finger swipe, etc.) to view and easily interact with the entirety of an ebook by reading portions of the book aloud.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 2:
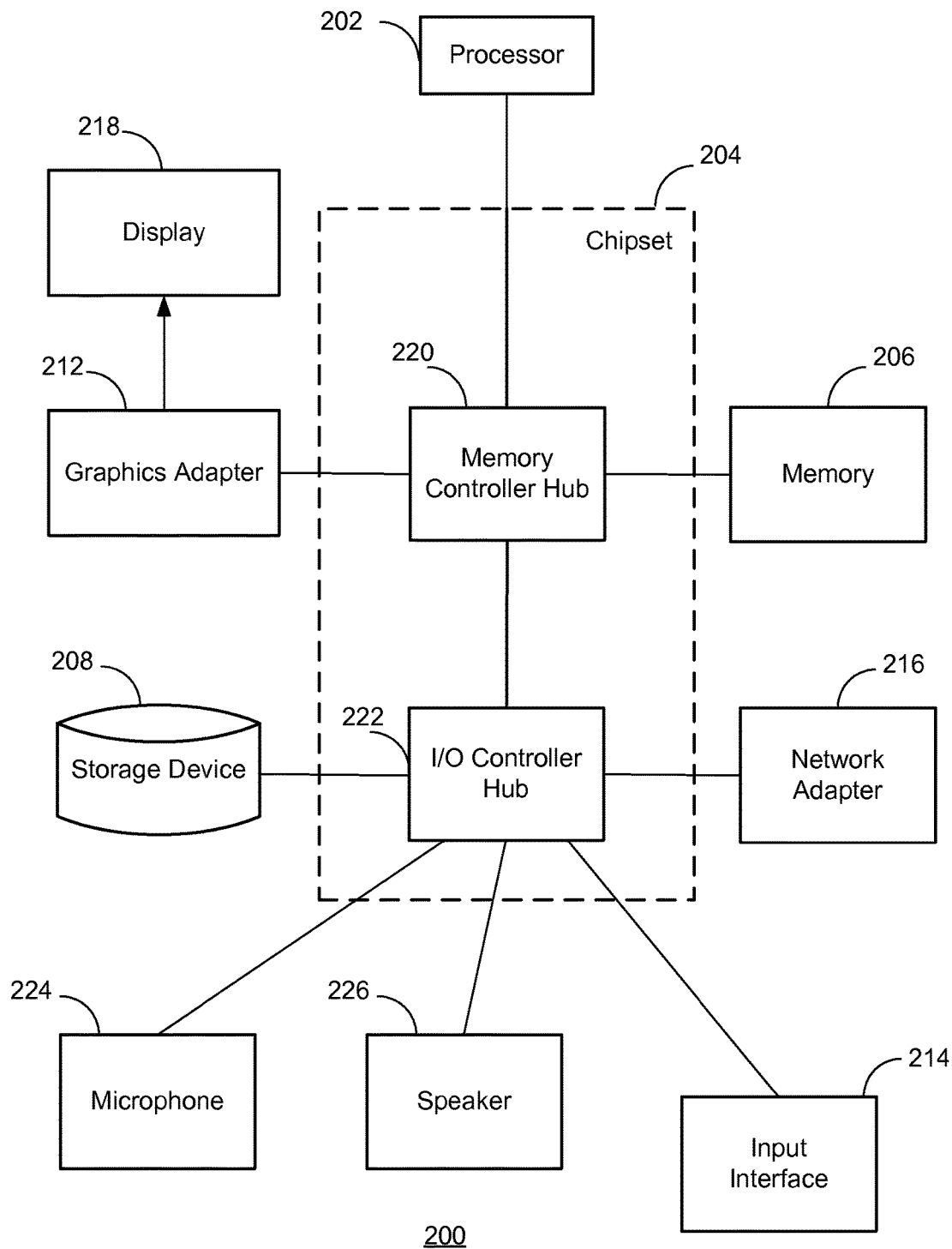
FIG. 2 is a high-level block diagram illustrating an example computer for implementing the entities shown in FIG. 1.

FIG. 2 is a high-level block diagram illustrating an example computer 200 for implementing the entities shown in FIG. 1. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216, a microphone 224, and a speaker 226 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. One or both of the microphone 224 and the speaker 226 may be integral to the computer 200, or one or both may be an external peripheral that is coupled to the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the user device 100 may interact with one or more servers working together to provide the functionality described herein. The computers 200 can lack some of the components described above, such as keyboards 210, graphics adapters 212, and displays 218.

Figure 3:
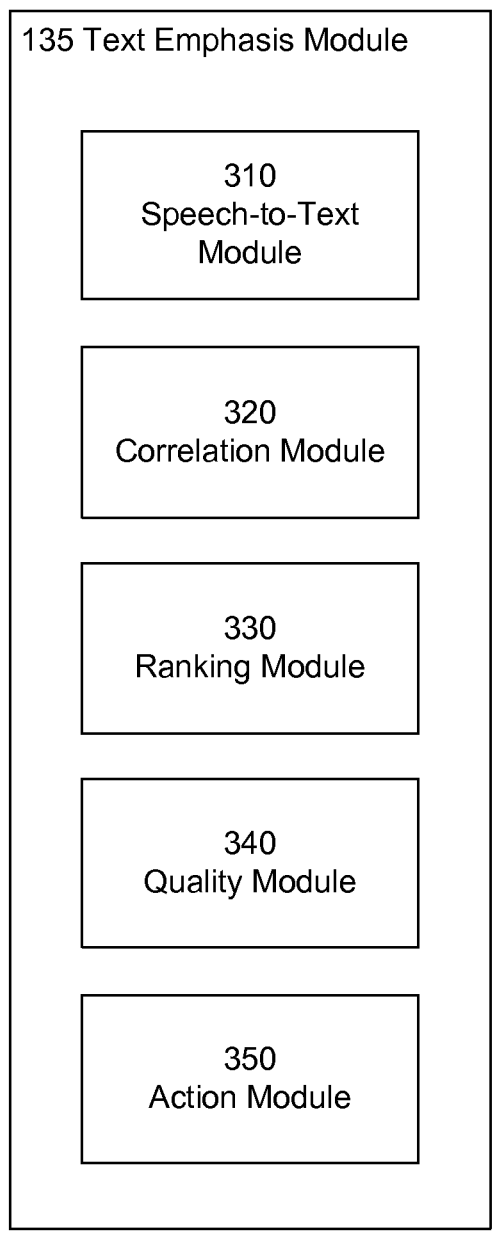
FIG. 3 is a high-level block diagram illustrating a detailed view of modules within a text emphasis module according to one embodiment

FIG. 3 is a high-level block diagram illustrating a detailed view of modules within the text emphasis module 135 according to one embodiment. Some embodiments of the text emphasis module 135 have different modules than those described here. Similarly, the functions can be distributed among the modules in a different manner than is described here. The text emphasis module 135 is comprised of modules including a speech-to-text module 310, a correlation module 320, a ranking module 330, a quality module 340, and an action module 350.

The speech-to-text module 310 converts audio data, or a portion thereof, received from the audio module 120 to spoken-text data. The speech-to-text module 310 then passes the spoken-text data to the correlation module 320. In some embodiments, the speech-to-text module 310 may perform voice recognition on one or more voices present in the audio data. For example, the speech-to-text module 310 may be able to distinguish between the voices of a father and his child. In some embodiments, the speech-to-text module 310 may be able to filter the spoken-text data to exclude data corresponding to one or more recognized voices. For example, the user may wish to emphasize words in the ebook spoken by the parent, but not words in the ebook spoken by the child.

The correlation module 320 is configured to determine one or more similarity scores based on a comparison between the spoken-text data and the text data associated with the displayed portion of the ebook. A similarity score measures how closely the spoken-text data corresponds with words that make up the text data being displayed to the user (e.g., the displayed portion of the ebook). In some embodiments, the correlation module 320 may use an edit distance between the text data and the spoken-text data to generate the similarity scores. Alternatively, in some embodiments, the correlation module 320 is configured to generate the similarity scores using pronunciation data associated with the text data at the reading location. This may help with correctly processing homophones (e.g., "two" versus "too").

In some embodiments, the correlation module 320 is configured to generate similarity scores for all the text data associated with the displayed portion of the ebook. In alternate embodiments, the correlation module 320 is configured to generate similarity scores for a portion of the text data associated with the displayed portion of the ebook. For example, generating similarity scores for text data within a number of words from the previously emphasized word. The correlation module 320 is configured to pass the similarity scores to the ranking module 330, or some other module.

Additionally, in some embodiments, the correlation module 320 may weight the similarity scores using additional factors. Additional factors can include, for example, locations of one or more previously emphasized words, time elapsed since a word was emphasized, location of text data on the displayed portion of the ebook, elapsed time since a page was turned or content scrolled, or some combination thereof. For example, a location of the most recently emphasized word may have the most weight (i.e., result in the largest adjustment in similarity score), a location of the second most recently emphasized word may have a lesser weight, and so on. Likewise, after a page of the ebook is turned the location of the first word normally read on the page may have more weight than other words on the page. Weighting the similarity scores in the manner described above may help distinguish which word was actually spoken by the user when there are multiple instances of the word were displayed to the user at the same time (e.g., different locations on the page viewed by the user).

The ranking module 330 is configured to rank the similarity scores to determine a reading location in the text data that corresponds to the spoken-text data. The ranking module 330 orders the similarity scores (e.g., highest to lowest). The ranking module 330 extracts a reading location from the text data that is associated with the highest similarity score. The reading location is the location in the displayed portion of the ebook that was just read aloud by the user. In some embodiments, where there are multiple instances of a word on a page, the reading location may initially be associated with multiple locations, however, as the user continues to read the displayed portion of the ebook aloud, the text emphasis module 135 is able to determine the reading location of the user. Additionally, the results of the ranking may indicate that the spoken data is not on the page. Accordingly, the ranking module 330 may effectively filter out speech that is not relevant to the text (e.g., a tangential conversation going on between the parent and the child).

The quality module 340 is configured to determine a pronunciation score using the spoken-text data and pronunciation data associated with the text data at the reading location. In some embodiments, the quality module 340 retrieves pronunciation data associated with the text data at the reading location from the media database 125, the media source 115, or some combination thereof. The quality module 340 compares the retrieved pronunciation data to the spoken-text data to generate a pronunciation score. The pronunciation score is a measure of the correctness of the user's pronunciation of a word. In some embodiments, the quality module 340 may divide up the spoken-text data into phonemes and compare those to phonemes extracted from the pronunciation data. The quality module 340 may then generate a pronunciation score that measures the similarity in the phonemes extracted from the spoken-text data and the phonemes extracted from the pronunciation data. Alternatively, in some embodiments, an edit distance between the pronunciation data and the corresponding text data may be the pronunciation score. The quality module 340 is configured to provide pronunciation scores to the action module 340.

The action module 350 is configured to perform an action based in part on the reading location and the pronunciation score. Actions may include, for example, instructing the ebook reader 130 to turn the page, instructing the ebook reader 130 to scroll the displayed text data, emphasizing text data that corresponds to the reading location, emphasizing text data that is adjacent to the text data corresponding to the reading location, providing a pronunciation tip, or some combination thereof. The action module 350 is configured to perform the actions (e.g., in 'real time') in response to the user client 100 receiving the audio data (e.g., in 'real time').

In some embodiments, the action module 350 is configured to instruct the ebook reader 130 to turn the page of the ebook based on the reading location. For example, the action module 350 may automatically instruct the ebook reader 130 to turn the page if the reading location indicates the reading location is at the end (e.g., reading location corresponds to the last word normally read by the user-text data at the bottom right of the page) of the displayed portion of the ebook.

In some embodiments, the action module 350 is configured to instruct the ebook reader 130 to scroll the displayed text data based on the reading location. Responsive to the reading location being at the end of a reading region within the displayed portion of the ebook, the action module automatically scrolls the text data such that the word following the reading location is positioned at the beginning of the reading region. The size of the reading region may be determined by, for example, a user of the user client 100, automatically by the action module 240, or both. For example, the action module 350 may be configured to scroll the text data to keep the reading location centered in a display of user device 100.

The action module 350 is able to emphasize text data (or portions thereof) that correspond to the reading location. For example, if the reading location indicates that the last word read aloud by the user is "happy," the action module 350 may highlight the word "happy" appearing on the displayed page. Additionally, in some embodiments, the action module 350 may also emphasize in a different manner the word subsequent to the last word read aloud by the user. Continuing with the above example, "happy" may be highlighted using a solid background, and the subsequent word may be highlighted with a partially transparent background. As the user continues to read the text, the action module, in real time, emphasizes the last word spoken by the user, deemphasizes the previous word spoken by the user. Thus, illustrating what text corresponds to the last word in the displayed portion of the ebook read by the user.

In some embodiments, the action module 350 is configured to determine how the text data is emphasized based in part on the associated pronunciation score. The action module 350 is configured to select an emphasis type based on the pronunciation score, and emphasize text data using the selected emphasis type. Emphasis types include, for example, highlighting, bolding, italicizing, underlining, changing font, changing type face, or some combination thereof. For example, the action module 350 may highlight text data with a high pronunciation score green and highlight text data with a low pronunciation score red. Additionally, in some embodiments, the action module 350 may be configured to not emphasize the text until the pronunciation score meets a threshold level.

In some embodiments, the action module 350 is configured to present a pronunciation tip to the user based on the pronunciation score. A pronunciation tip is media data that provides instruction regarding pronunciation of a particular word or phrase. A pronunciation tip may include, for example, text showing the phonetic spelling of one or more words, a selectable link to an audio file of one or more proper pronunciations (e.g., American English and British English) of a word that when selected causes the user device 100 to play the audio file, or some combination thereof. A pronunciation tip may be provided to the user if the pronunciation score does not meet some threshold level. In some embodiments, the pronunciation tip is automatically presented to the user based on the pronunciation score. In alternate embodiments, the action module 350 provides an indication that the pronunciation tip is available based on the pronunciation score. For example, if the pronunciation score is low the action module displays a selectable icon that indicates a pronunciation tip is available to the user.

In alternate embodiments, the text emphasis module 135 is on a device (e.g., GOOGLE GLASS®) separate from the source of the content being read. Moreover, in these embodiments, content other than an ebook or digital content may be read aloud by the user or some other party. For example, a parent (or a user of the user device 100) may read aloud from a paper book, paper magazine, etc. In some of these embodiments, the user provides an identifier to the text emphasis module 135 identifying the material being read. The text emphasis module 135 then is able to obtain the text data associated with the material being read. Alternatively, the user device 100 may be configured to identify text data using one or more images of the text (e.g., via optical character recognition). In some embodiments, the user device 100 may display a digital image of the page including the emphasized text to the user (e.g., parent reads a book to a child, and the child see a digital copy of portions of text being read including any emphasized text). In some of these embodiments, a user may be able to view the actual object being read through the user device 100 (e.g., GOOGLE GLASS®). Thus, the user device 100 can be configured to display images to the user that overlay portions of the content being read (e.g., paper copy of a book) are being emphasized (e.g., making it appear that one or more words in the paper copy of the book are highlighted).

Figure 4:
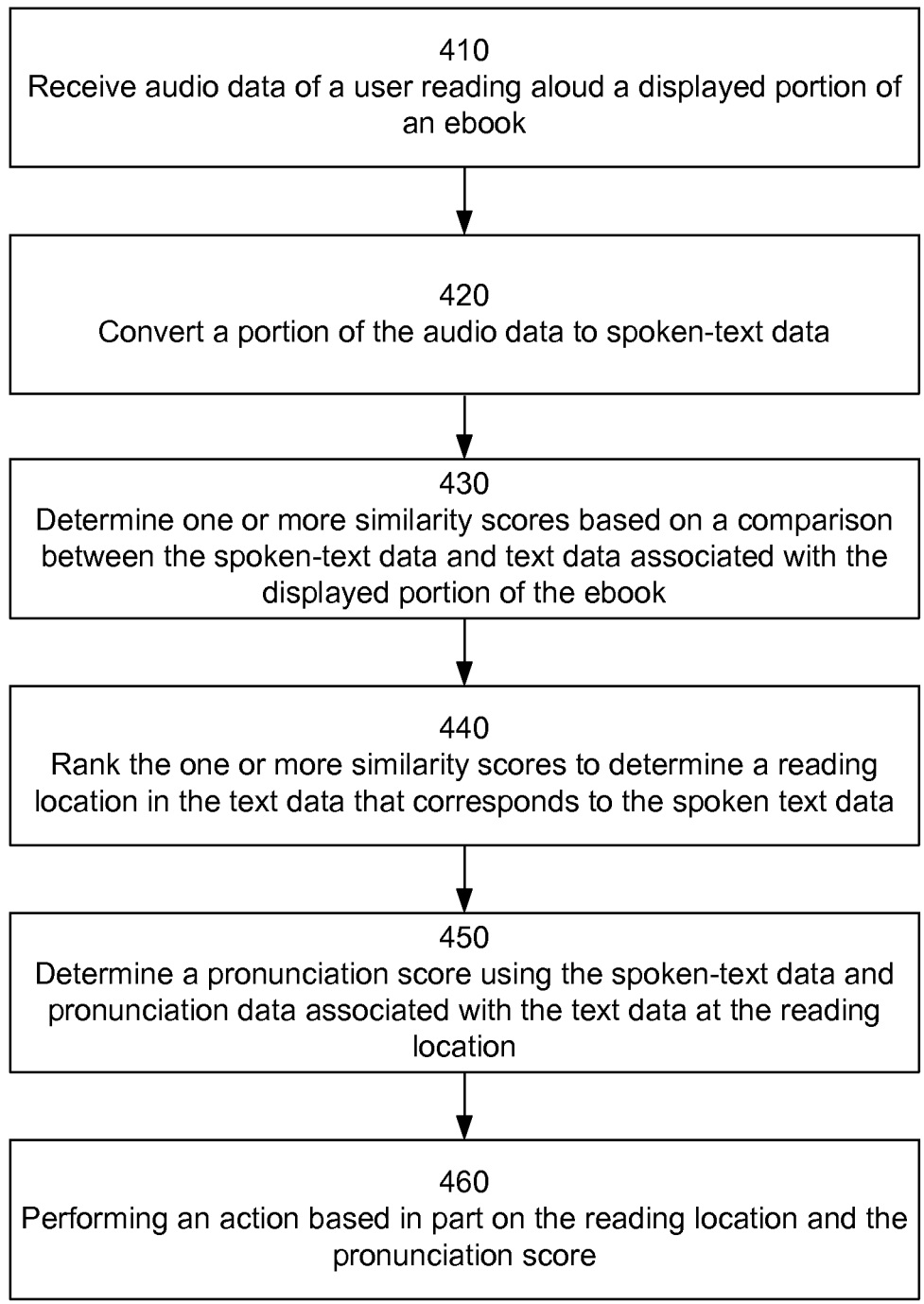
FIG. 4 is a flowchart illustrating a process of interacting with an ebook using speech recognition according to one embodiment.

FIG. 4 is a flowchart illustrating a process of interacting with an ebook using speech recognition according to one embodiment. In one embodiment, the process of FIG. 4 is performed by the user device 100. Other entities may perform some or all of the steps of the process in other embodiments. Likewise, embodiments may include different and/or additional steps, or perform the steps in different orders.

The user device 100 receives 410 audio data of a user reading aloud a displayed portion of an ebook. The user device 100 converts 420 a portion of the audio data to spoken-text data. In some embodiments, the user device 100 may perform voice recognition on the spoken-text data, and filter out one or more voices. For example filtering the voice of a parent, but passing the voice of a child, or vice versa. Or, in some embodiments, the user device 100 may filter out speech that is not relevant to the text (e.g., a tangential conversation going on between the parent and the child).

The user device 100 determines 430 one or more similarity scores based on a comparison between the spoken-text data and text data associated with the displayed portion of the ebook. For example, the user device 100 may use an edit distance between the text data and the spoken-text data to generate the similarity scores. Additionally, in some embodiments, the correlation module 320 may weight the similarity scores using additional factors (e.g., locations of one or more previously emphasized words, time elapsed since a word was emphasized, etc.). The user device 100 then ranks 440 the one or more similarity scores to determine a reading location in the text data that corresponds to the spoken-text data.

The user device 100 determines 450 a pronunciation score using the spoken-text data and pronunciation data associated with the text data at the reading location. The user device 100 retrieves pronunciation data associated with the text data at the reading location from, for example, the media database 125, the media source 115, or some combination thereof. The user device 100 then compares the retrieved pronunciation data to the spoken-text data to generate a pronunciation score.

The user device 100 performs 460 an action based in part on the reading location and the pronunciation score. For example, the user device 100 may turn the page of the ebook when the last word the page is correctly pronounced, in accordance with the pronunciation score emphasize text data, emphasizing text data that is adjacent to the reading location (e.g., next word to be read), provide a pronunciation tip if the pronunciation score is below a threshold level, etc.

Figure 5B:
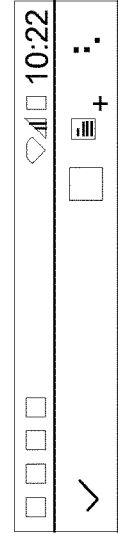
FIG. 5B illustrates the user interface of FIG. 5A showing emphasized text data tracking in accordance with text read by the user according to an embodiment.
Figure 5B:
Figure 5A:
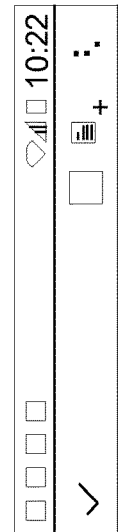
FIG. 5A illustrates an example of a user interface displayed by a user device showing emphasized text data according to an embodiment.
Figure 5A:

FIG. 5A illustrates an example of a user interface 500 displayed by a user device 100 showing emphasized text data according to an embodiment. The user interface 500 includes a displayed portion of an ebook 510. The user device 100 displays an emphasized word 520 that corresponds to the word last read aloud by the user of the displayed portion of the ebook 510. In this example, the last word read by the user is "mailman."

FIG. 5B illustrates the user interface of FIG. 5A showing emphasized text data tracking in accordance with text read by the user according to an embodiment. As the user reads the text, the emphasized word 520 tracks, in real time, with the text read by the user. For example, the user device 100 emphasizes a newly spoken word (e.g., does) and removes the emphasis associated with previously spoken word 530 (e.g., mailman).

FIG. 6A illustrates an example of a user interface 600 displayed by a user device 100 showing a reading location at the end of a reading region 630 according to an embodiment. The user interface 600 includes a displayed portion of an ebook 610. The user device 100 displays an emphasized word 620 that corresponds to the reading location of a user. In this example, the user device 100 is configured to scroll the text data to keep the reading location of the user within the region 630. As the user continues to read the text, the emphasized word 620 tracks, in real time, with the text read by the user. In this example, the emphasized word 620 is the last word in the region 630, and the next word 640 is outside the region 630. Responsive to the emphasized word 620 being the last word in the region 630, the user device 100 is configured to automatically scroll the text data such that the next word 640 is located at the beginning of the region 630.

FIG. 6B illustrates the user interface of FIG. 6A showing scrolled text data such the reading location is at the beginning of the reading region according to an embodiment. In this example the text data has scrolled such that the next word 640 in FIG. 6A, now corresponds to the user's reading location (e.g., emphasized word 650) that is in the beginning (e.g., top left) of the region 630.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives.

It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for automated dictionary generation. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A computer-implemented method of interacting with an ebook using speech recognition, comprising:
presenting, on a display of a user device, a displayed portion of an ebook;
receiving, at the user device, audio data of a user reading aloud the displayed portion of an ebook;
converting a portion of the audio data to spoken-text data;
determining one or more similarity scores based on a comparison between the spoken-text data and text data associated with the displayed portion of the ebook;
weighting the one or more similarity scores based in part on a location of a previously emphasized word that corresponds to a previous reading location of the user in the text data and a time elapsed since the previously emphasized word was emphasized;
ranking the one or more weighted similarity scores;
determining a reading location in the text data that corresponds to the spoken-text data based on the ranking of the one or more weighted similarity scores;
determining a pronunciation score using the spoken-text data and pronunciation data associated with the text data at the reading location;
performing one or more actions based in part on the reading location and the pronunciation score, the one or more actions including:
responsive to the pronunciation score meeting a threshold value, selecting an emphasis type based on the pronunciation score, and
emphasizing the text data at the reading location in accordance with the selected emphasis type; and
outputting the performed one or more actions on the display of the user device.

2. The computer-implemented method of claim 1, wherein performing one or more actions based in part on the reading location and the pronunciation score comprises:
emphasizing text data that is adjacent to the reading location, in a manner that is different from the emphasized text data that corresponds to the reading location.

3. The computer-implemented method of claim 1, wherein performing one or more actions in part on the reading location and the pronunciation score comprises:
responsive, to the reading location being at the end of the displayed portion of the ebook, automatically turning the page of the ebook.

4. The computer-implemented method of claim 1, wherein performing one or more actions based in part on the reading location and the pronunciation score comprises:
responsive to the reading location being at the end of a reading region within the displayed portion of the ebook, automatically scrolling the text data such that the reading location is positioned at the beginning of the reading region.

5. The computer-implemented method of claim 1, further comprising:
weighting the similarity scores by one or more additional factors, and wherein the additional factors are selected from a group consisting of: a location on the displayed portion of the ebook, elapsed time since a page was turned or text data scrolled, or some combination thereof.

6. A non-transitory computer-readable storage medium storing executable computer program instructions for interacting with an ebook using speech recognition, the instructions executable to perform steps comprising:
presenting, on a display of a user device, a displayed portion of an ebook;
receiving, at the user device, audio data of a user reading aloud the displayed portion of an ebook;
converting a portion of the audio data to spoken-text data;
determining one or more similarity scores based on a comparison between the spoken-text data and text data associated with the displayed portion of the ebook;
weighting the one or more similarity scores based in part on a location of a previously emphasized word that corresponds to a previous reading location of the user in the text data and a time elapsed since the previously emphasized word was emphasized;
ranking the one or more weighted similarity scores;
determining a reading location in the text data that corresponds to the spoken-text data based on the ranking of the one or more weighted similarity scores;
determining a pronunciation score using the spoken-text data and pronunciation data associated with the text data at the reading location;
performing one or more actions based in part on the reading location and the pronunciation score, the one or more actions including:

responsive to the pronunciation score meeting a threshold value, selecting an emphasis type based on the pronunciation score, and emphasizing the text data at the reading location in accordance with the selected emphasis type; and outputting the performed one or more actions on the display of the user device.

7. The computer-readable medium of claim 6, wherein performing one or more actions based in part on the reading location and the pronunciation score comprises:

emphasizing text data that is adjacent to the reading location, in a manner that is different from the emphasized text data that corresponds to the reading location.

8. The computer-readable medium of claim 6, wherein performing one or more actions based in part on the reading location and the pronunciation score comprises:

responsive, to the reading location being at the end of the displayed portion of the ebook, automatically turning the page of the ebook.

9. The computer-readable medium of claim 6, wherein performing one or more actions based in part on the reading location and the pronunciation score comprises:

responsive to the reading location being at the end of a reading region within the displayed portion of the ebook, automatically scrolling the text data such that the reading location is positioned at the beginning of the reading region.

10. The computer-readable medium of claim 6, further comprising:

weighting the similarity scores by one or more additional factors, and wherein the additional factors are selected from a group consisting of: a location on the displayed portion of the ebook, elapsed time since a page was turned or text data scrolled, or some combination thereof.

11. A system for interacting with an ebook using speech recognition, comprising:

a display;

a processor configured to execute modules; and a memory storing the modules, the modules comprising:

an ebook reader configured to present on the display a displayed portion of an ebook;

a speech-to-text module configured to:

receive audio data of a user reading aloud the displayed portion of an ebook, and convert a portion of the audio data to spoken-text data;

a correlation module configured to:

determine one or more similarity scores based on a comparison between the spoken-text data and text data associated with the displayed portion of the ebook, and weight the one or more similarity scores based in part on a location of a previously emphasized word that corresponds to a previous reading location of the user in the text data and a time elapsed since the previously emphasized word was emphasized; and a ranking module configured to:

rank the one or more weighted similarity scores, and determine a reading location in the text data that corresponds to the spoken-text data based on the ranking of the one or more weighted similarity scores; and a quality module configured to determine a pronunciation score using the spoken-text data and pronunciation data associated with the text data at the reading location; and an action module configured to:

perform one or more actions based in part on the reading location and the pronunciation score, the one or more actions including:

responsive to the pronunciation score meeting a threshold value, selecting an emphasis type based on the pronunciation score, and emphasizing the text data at the reading location in accordance with the selected emphasis type; and output the performed one or more actions on the display of the user device.

12. The system of claim 11, wherein the action module is configured to emphasize text data that is adjacent to the reading location, in a manner that is different from the emphasized text data that corresponds to the reading location.

13. The system of claim 11, wherein the action module is configured to, responsive, to the reading location being at the end of the displayed portion of the ebook, automatically turn the page of the ebook.

14. The system of claim 11, wherein the action module is configured to, responsive to the reading location being at the end of a reading region within the displayed portion of the ebook, automatically scroll the text data such that the reading location is positioned at the beginning of the reading region.

* * * * *